March 14, 1950     E. A. COONS     2,500,737
CATALYTIC CONVERSION OF HYDROCARBONS
Filed April 30, 1947
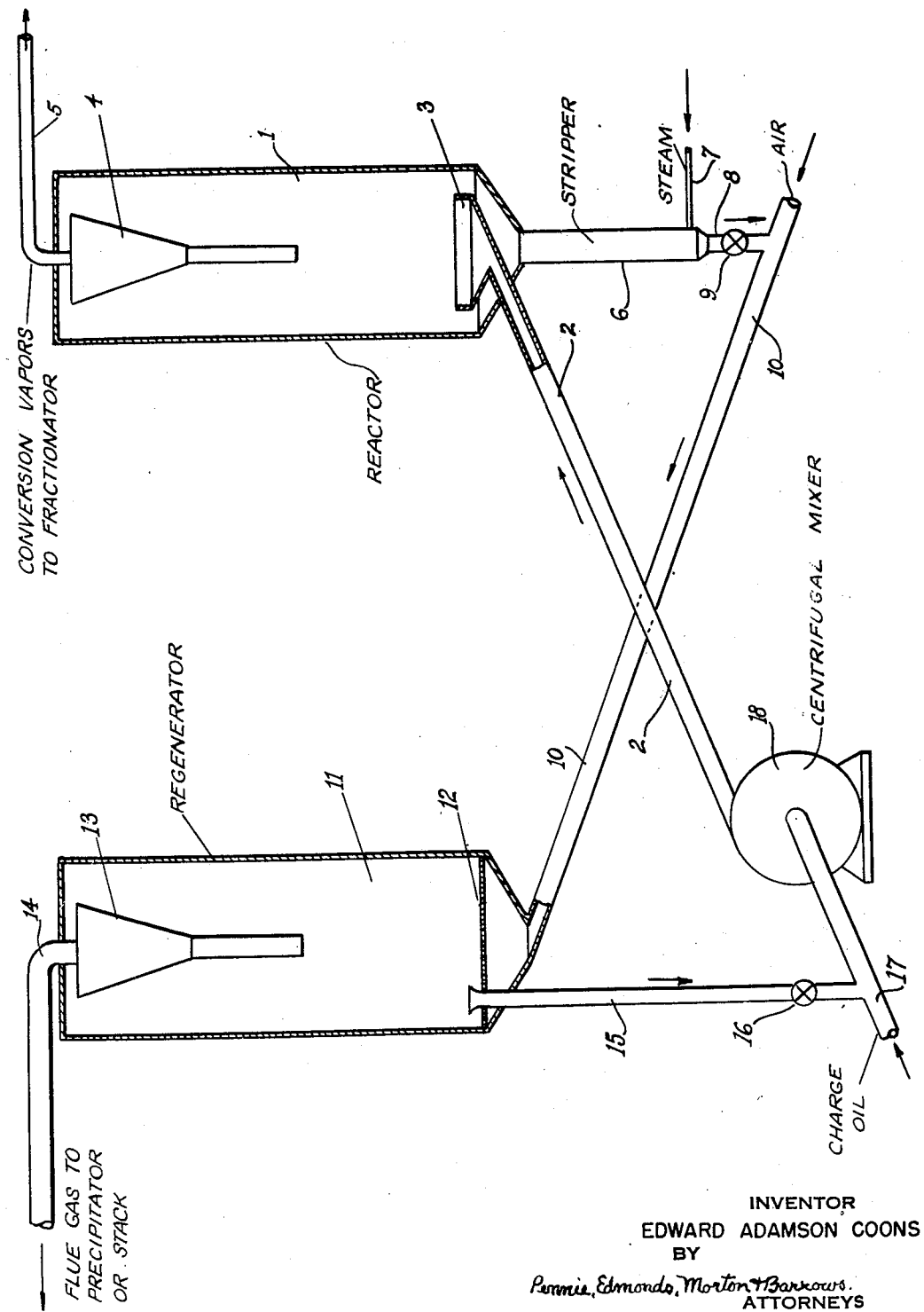
INVENTOR
EDWARD ADAMSON COONS
BY
Pennie, Edmonds, Morton & Barrows.
ATTORNEYS Patented Mar. 14, 1950

2,500,737

UNITED STATES PATENT OFFICE 2,500,737

CATALYTIC CONVERSION OF HYDROCARBONS

Edward A. Coons, Chicago, Ill., assignor to Sinclair Refining Company, New York, N. Y., a corporation of Maine Application April 30, 1947, Serial No. 745,044

3 Claims. (Cl. 196—52)

This invention relates to the pyrolytic conversion of hydrocarbons and, more particularly, to pyrolytic conversion processes involving the use of finely divided catalyst.

The invention is especially applicable to conversion processes of the general type wherein a finely divided catalyst, at elevated temperature, is suspended in the charge oil, passed to a reactor in which conversion of the oil occurs and in which the spent catalyst is separated from the oil vapors, the separated catalyst stripped of oil, regenerated by decarbonizing the catalyst and the regenerated catalyst again suspended in the stream of charge oil passing to the reactor.

Operations of the type described are commonly designated fluid catalyst processes. In conventional operation, as just noted, the spent catalyst is passed from the reaction zone, stripped of oil and regenerated. The regenerated catalyst is introduced into a stream of hot oil passing to the reaction zone, in vapor phase or mixed phase, and carried along to the reaction zone by the oil stream.

In order to obtain the maximum yield of the desired reaction product, maximum uniformity of dispersion of the catalyst in the oil vapors in the reactor is essential. In conventional practice, the finely divided catalyst entering the reactor is frequently not uniformly dispersed in the oil and uniform contact between the hydrocarbon vapors and the catalyst in the reaction zone is not attained, with the result of lowered efficiency of the desired conversion reaction. More uniform contact between the catalyst and oil vapors in the reactor is promoted if the catalyst is more uniformly dispersed in the entering charge oil.

The present invention provides improvements in conversion operations of the fluid catalyst type whereby a more thorough and uniform contact of the catalyst with the oil vapors in the reaction zone is assured.

In accordance with my present invention, the charge oil, to which the catalyst has been added, is subject to vigorous, mechanical agitation, prior to introduction to the reaction zone. This mechanical agitation may be effected, for instance, by passing the suspension through a mechanical mixer of conventional type adapted to withstand existing temperature and pressure conditions, advantageously a centrifugal type mixer.

The invention will be further described and illustrated, with reference to the accompanying drawing, which represents conventionally and diagrammatically a flow diagram of a fluid catalyst cracking operation embodying my invention.

The apparatus indicated by reference numeral 1, of the accompanying drawing, represents a generally cylindrical reactor of conventional type. The finely divided catalyst suspended in vaporized charge oil enters the reactor through conduit 2 extending into the reactor and terminating in a conical member 3 of somewhat smaller diameter than the reactor and opening into the reactor through a conventional grid. As the hot oil vapors pass upwardly through the reactor there is a tendency for the catalyst to drop out of suspension forming a so-called "high density" or "dense phase" fluidized body of catalyst in the reactor which flows downwardly through the annular space between the member 3 and the wall of the reactor.

Oil vapors, product of the conversion, rise to the top of the reactor, pass through a cyclone type separator 4 to remove suspended catalyst from the vapors, the latter passing therefrom through conduit 5 to fractionating apparatus, not shown, and the separated catalyst is returned to the dense phase body of catalyst in the reactor.

Spent catalyst flows from the bottom of the reactor into stripper 6 and passes downwardly through the stripper countercurrent to steam or other stripping medium injected into the lower end of the stripper through line 7. Stripped catalyst passes from the stripper through conduit 8, in which there is interposed a conventional valve arrangement indicated at 9 for controlling the flow of the catalyst, advantageously a slide valve. From thence, the spent catalyst flows into conduit 10 where it is picked up by a current of air, or other oxidizing gas, and carried up into the regenerator 11, of conventional type, wherein the carbon deposited on the spent catalyst is burned off by air entering through the conduit 10.

In the drawing, the conduit 10 is shown as leading to the lower end of the regenerator, the catalyst passing therefrom upwardly into the regenerator through grid 12. From the upper end of the regenerator the hot products of combustion pass through a cyclone type separator 13 and out through conduit 14 to a precipitator, or stack, not shown.

The regenerated catalyst gravitates downwardly forming a relatively dense fluidized bed of catalyst above the grid from which it is withdrawn through the regenerated catalyst leg 15, which is normally of sufficient length to form an effective seal against the upward passage of vapors therethrough into the regenerator and in which there is interposed a valve arrangement 16, for instance, a slide valve of conventional type for controlling catalyst flow. From thence, the regenerating catalyst flows into conduit 17 where it is picked up by the vaporized charge oil and carried into a centrifugal mixer diagrammatically represented at 18.

In mixer 18, the oil vapors and catalyst are subjected to vigorous, mechanical agitation adapted to effect, as nearly as possible, complete mixing and uniform suspension of the catalyst in the oil vapors. From thence, the oil vapors, with the catalyst suspended therein, pass through conduit 2 to the reactor as previously described.

The catalyst employed may be of the type conventionally used in fluid catalyst processes, for instance, a silica-alumina type catalyst, in finely divided, or powdered, form. The reaction conditions may, likewise, be those conventionally used in operations of this type and, as understood by the art, the optimum temperatures and pressures will depend primarily upon the type of feed stock used, the particular catalyst employed, and the reaction desired.

In cracking gas oil, for instance, the reaction temperature may, with advantage, be within the range of about 800° to 1,000° F. and the pressure at the top of the reactor within the range of about 5 to 25 pounds per square inch. The regeneration temperature may be within the range of 950° to 1,200° F., heat for the reaction being supplied largely by the hot catalyst passing into the charge oil from the regenerator.

I claim:

1. In the fluid catalyst process for the conversion of hydrocarbons wherein a finely divided catalyst suspended in vaporized charge oil to be converted is passed to a reaction zone in which there is maintained a body of fluidized catalyst of relatively high density with a superimposed dispersed phase, spent catalyst from the reaction zone is stripped of oil, regenerated and returned to the reaction zone in suspension in the charge oil, the steps of withdrawing regenerated catalyst from the zone of regeneration, preliminarily suspending the withdrawn catalyst in vaporized charge oil, subjecting the resultant suspension to a vigorous mechanical agitation and thereafter passing the resultant suspension to the reaction zone.

2. In the fluid catalyst process for the conversion of hydrocarbons wherein a finely divided catalyst suspended in vaporized charge oil to be converted is passed to a reaction zone in which there is maintained a body of fluidized catalyst of relatively high density with a superimposed dispersed phase, spent catalyst from the reaction zone is stripped of oil, regenerated and returned to the reaction zone in suspension in the charge oil, the steps of withdrawing regenerated catalyst from the zone of regeneration, preliminarily suspending the withdrawn catalyst in vaporized charge oil, subjecting the resultant suspension to a vigorous centrifugal mixing and thereafter passing the resultant suspension to the reaction zone.

3. In the fluid catalytic process for the conversion of hydrocarbons wherein a finely divided catalyst is passed to a reaction zone in suspension in vaporized charge oil to be converted wherein there is maintained a body of fluidized catalyst of relatively high density with a superimposed dispersed phase, the steps of preliminarily suspending catalyst to be passed to the reaction zone in vaporized charge oil, subjecting the resultant suspension to vigorous mechanical agitation and thereafter passing the resultant suspension to the reaction zone.

EDWARD A. COONS.

REFERENCES CITED

The following references are of record in the file of this patent:

UNITED STATES PATENTS

| Number | Name | Date |
|---|---|---|
| 2,326,438 | Clarke et al. | Aug. 10, 1943 |
| 2,348,009 | Johnson et al. | May 2, 1944 |
| 2,364,145 | Huppke et al. | Dec. 5, 1944 |
| 2,398,489 | Arveson | Apr. 16, 1946 |
| 2,420,129 | Flock et al. | May 6, 1947 |